Jan. 19, 1932.  C. E. JOHNSON  1,841,604
WATER COOLED PUMP HEAD BEARING
Filed Feb. 9, 1927   2 Sheets-Sheet 2
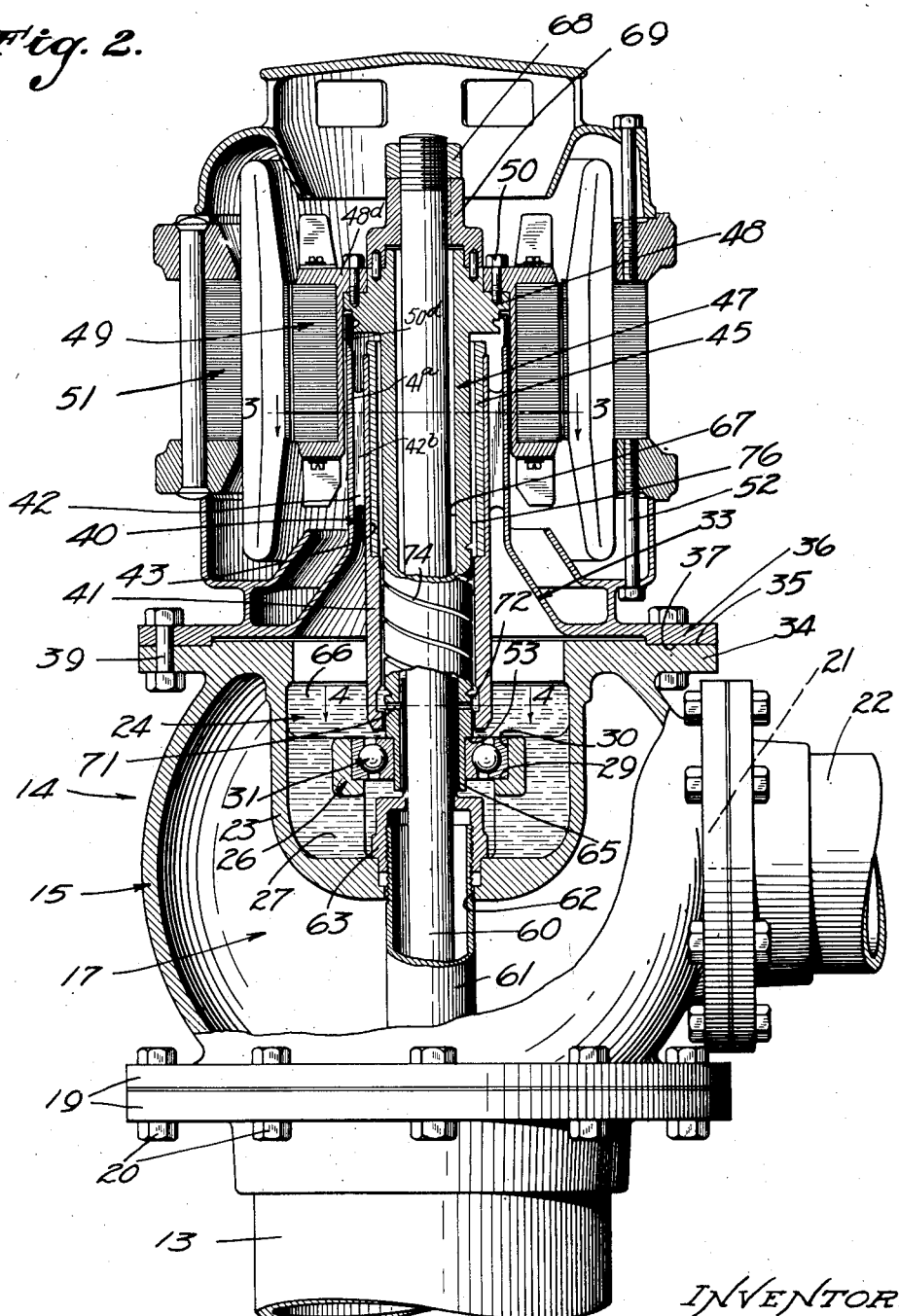
Fig. 2.
INVENTOR:
CARL E. JOHNSON
By
ATTORNEY.

Patented Jan. 19, 1932

1,841,604

UNITED STATES PATENT OFFICE

CARL E. JOHNSON, OF LOS ANGELES, CALIFORNIA, ASSIGNOR TO UNITED STATES ELECTRICAL MANUFACTURING COMPANY, OF LOS ANGELES, CALIFORNIA, A CORPORATION OF CALIFORNIA

WATER-COOLED PUMP-HEAD BEARING

Application filed February 9, 1927. Serial No. 166,859.

This invention relates to a pump-head construction which is suitable for use in turbine irrigation pumps.

In those types of pump-heads which employ a ball bearing thrust bearing and a sleeve type radial bearing it is highly desirable to have an accurate T relation between these bearings, that is, the axis of the sleeve bearing should be absolutely at right angles to the plane in which the balls of the thrust bearing rotate. This is essential because otherwise the thrust is not evenly distributed over the entire thrust bearing, and the thrust bearing will be damaged very soon.

It is an object of this invention to provide a pump-head having a perfect T relation between the sleeve bearing and thrust bearing thereof. I accomplish this object of my invention by supporting the thrust bearing by one part and supporting the sleeve bearing by a second part which is secured directly to the first part. In the ordinary construction there are a number of interposed parts between the one which supports the thrust bearing and the one which supports the sleeve bearing and any errors in the size or machining of these parts collectively throw the bearings out of perfect T relation. In my invention there are only two interposed parts and these two parts are designed so that they may be accurately machined without any difficulty.

The bearings of a pump-head support a considerable load and operate at high speeds. It is, therefore, necessary that these bearings have proper lubrication and be kept as cool as possible.

It is an object of this invention to provide a pump-head which is designed so that the lubricating oil will be cooled by the water passing through the pump-head. This object of the invention is accomplished by providing an oil bowl which extends downward into a water chamber through which the water being pumped passes, this water contacting the oil bowl at the bottom and at the sides.

In my invention the thrust bearing is placed in the oil bowl where it revolves in the body of oil therein, but the sleeve bearing is mounted above the oil bowl and does not operate in a body of oil.

It is an object of this invention to provide a pump-head in which oil is circulated to the upper bearing by means of a novel oil pump located in the oil bowl.

Other objects and advantages of the invention will be made evident hereinafter.

Referring to the drawings in which I illustrate a preferred form of the invention:

Fig. 2 is a vertical cross-section through a pump-head embodying the features of the invention.

Fig. 3 is a section taken on the line 3—3 of Fig. 2.

Fig. 4 is a section taken on the line 4—4 of Fig. 2.

Figure 1:
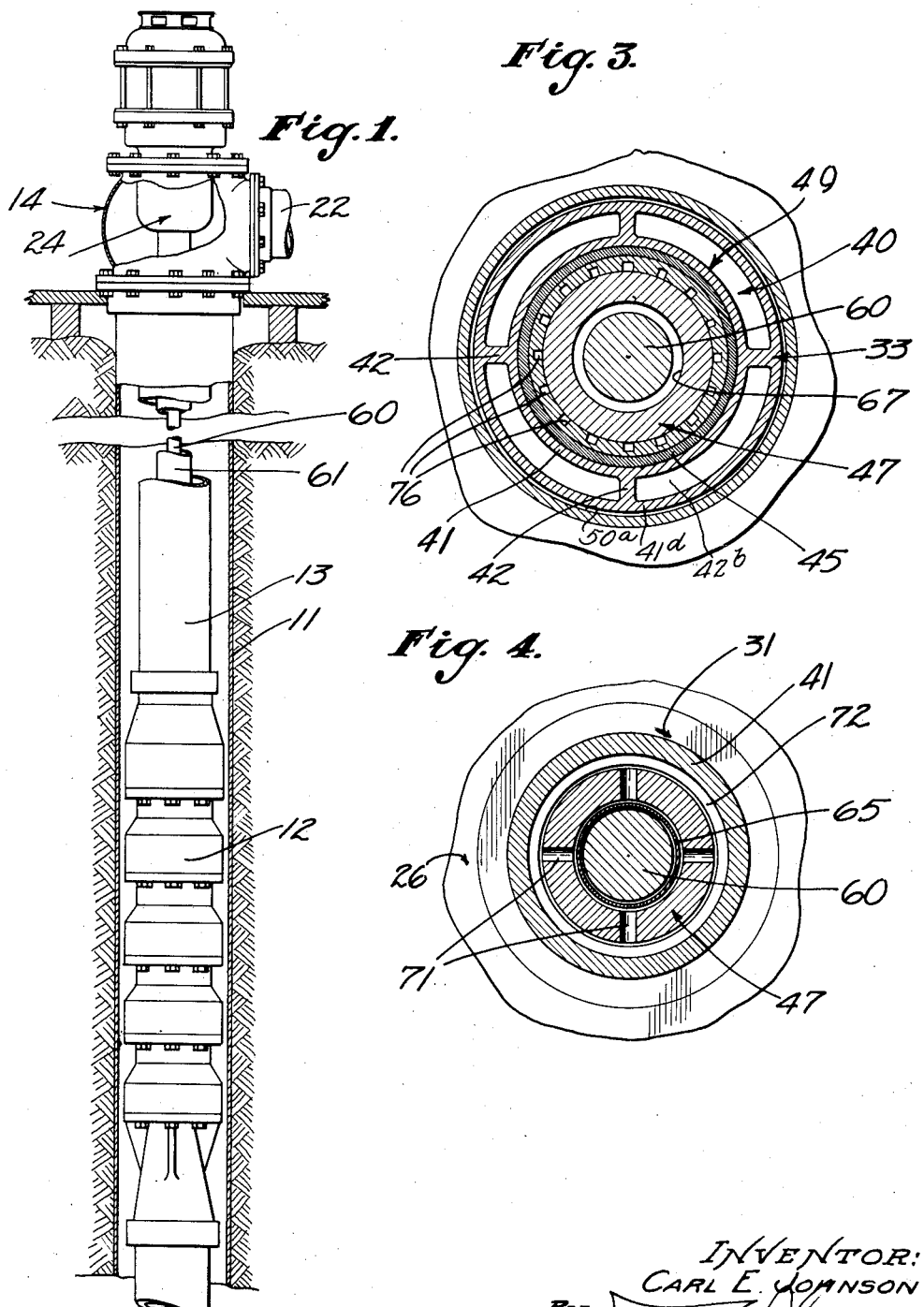
Fig. 1 is a diagrammatic view showing a pump construction in which my invention is utilized.

Referring to the drawings and particularly to Fig. 1, the numeral 11 represents a well in which a pump unit 12 is installed. The pump unit 12 is secured to the lower end of a discharge pipe 13 which extends upward to the surface of the ground where it is connected to a pump-head 14 embodying the features of this invention.

The pump-head 14 is shown in detail in Figs. 2 to 4 inclusive. Referring to these figures the pump-head 14 has a body 15 which provides a water chamber 17. The water chamber 17 is in communication with the upper end of the discharge pipe 13, the body 15 being attached to the upper end of the discharge pipe 13 by flanges 19 through which bolts 20 extend. The water chamber 17 also has an outlet 21 which connects to a pipe 22 for delivering the water to a storage tank or place of use.

The body 15 has walls 23 which extend downward into the water chamber 17 and form an oil bowl 24. It should be noted that the oil bowl 24 is situated entirely inside the water chamber 17 and is contacted by water passing through the water chamber 17 on the bottom and on the sides. Supported in the oil bowl 24 is a bearing holder 26, this bearing holder 26 being carried by webs 27. The bearing holder 26 has an annular horizontal wall 29 and a vertical cylindrical wall 30. Supported by the walls 29 and 30 of the bearing holder 26 is a thrust bearing 31 which is in the form of a ball bearing. Supported by the body 15 is a shell 33. The body 15 has a flange 34, an upper face 35 of which is accurately machined so as to be in a plane parallel to the wall 29 and at right angles to the cylindrical wall 30 of the bearing holder 26. The shell 33 has a flange 36 having an accurately machined face 37 which is clamped in contact with the face 35 of the flange 34 by suitable bolts 39. The central part of the shell 33 is in the form of a neck and provides a cavity 40 which is in communication with the oil bowl 24. This cavity 40 is formed between a cylindrical sleeve 41 and a collar member 41a. Webs 42 extend between the sleeve 41 and the collar member 41a and define vertical passages 42b through which oil circulates in a manner to be hereinafter described. The sleeve 41 has a counterbored portion 43 which is accurately machined and is formed concentric to an axis which extends at right angles to the plane of the face 37 of the flange 36. The axis of the counterbore 43 aligns with the axis around which the cylindrical wall 30 of the bearing holder 26 is formed. Placed in the counterbore 43 is a sleeve bearing 45 which is concentric to the axis of the counterbore 43 and the cylindrical wall 30.

Extending downward through the cavity 40 and into the upper part of the oil bowl 24 is a spindle 47. The upper end of the spindle 47, which is outside the cavity 40, is provided with a flange 48 to which is secured a flange 48a formed on the extreme upper end of the rotor 49 of an electric motor, the flanges 48 and 48a being secured together by cap screws 50. The rotor 49 provides a chamber 50a into which the neck of the shell 33 extends, this chamber being only slightly larger in diameter than the outer diameter of the collar member 41a, so that a fluid moving through the passages 42b cools the rotor 49, the heat being conducted through the collar member 41a. Surrounding the rotor 49 is a stator 51 which is supported by the shell 33, being secured thereto by bolts 52.

The lower end of the spindle 47 is reduced in diameter so as to provide a shoulder 53 which engages an inner race of the thrust bearing 31, whereby the spindle 47 is supported. The part of the spindle 47 which extends through the sleeve bearing 45 is cylindrical and is centralized by the sleeve bearing.

The impellers of the pump unit 12 are operated by means of a pump shaft 60 which extends from the pump head 14 to the unit 12. Surrounding the pump shaft 60 is an oil tube 61. The upper end of the oil tube 61, as shown in Fig. 2, extends through an opening 62 formed in the bottom of the oil bowl 24. Screwed onto an upper threaded end of the oil tube 61 is a nut 63 by means of which tension may be placed on the oil tube. Extending upward from the nut 63 is an oil level tube 65 which prevents a body of oil 66 in the oil bowl 24 from flowing therefrom through the oil tube 61. The pump shaft 60 extends, as shown in Fig. 2, through the oil bowl 24, the level tube 65, and through an opening 67 formed concentrically through the spindle 47. The upper end of the shaft 60 is provided with an adjustable nut 68 which engages a block 69 supported by the spindle 47.

From the drawings it is apparent that the thrust bearing 31 is situated in the body of oil 66 but that the sleeve bearing 45 is located in the cavity 40 considerably above the body of oil 66. My invention provides a pump arrangement for delivering oil to the sleeve bearing 45. The lower end of the spindle 47 directly above the lower end of the sleeve 41 which projects into the body of oil 66 is provided with radial impeller openings 71. (See Fig. 4.) The lower end of the sleeve 41 is provided with an internal oil pressure chamber 72 to which these impeller openings 71 connect. Formed on the peripheral face of the spindle 47 are helical grooves 74, the lower ends of which are located in the oil pressure chamber 72 and the upper ends of which are located in the lower part of the sleeve bearing 45. The sleeve bearing 45, as shown in Figs. 2 and 3 is provided with vertical oil passages 76 so that oil may pass upward through the bearing and all of the bearing receives lubrication.

The operation of the invention is as follows:

The motor is energized and the spindle 47 is set into operation. The pump shaft 60 being connected to the spindle 47 is likewise rotated. The impellers, not shown, of the pump unit 12 are thus set into operation and water is pumped upward through the discharge pipe 13 into the water chamber 17 of the body 15, this water passing therefrom through the pipe 22. The water being withdrawn from subterranean water sands is cool and being brought into contact with the oil bowl 24 keeps the body of oil 66 therein cool. When the spindle 47 is rotating, oil which is located in the space between the oil level tube 65 and the spindle 47 is thrown outward through the radial impeller openings 71 into the oil pressure chamber 72. This centrifugal action builds up a pressure in the oil pressure chamber 72. The helical grooves 74 take the oil from the oil pressure chamber 72 and lift it upward through the sleeve 41, delivering it to the sleeve bearing 45. The oil flows upward in a continuous stream during the operation of the pump head. The stream of oil passes from the upper ends of the helical grooves 74 through the oil passages 76, contacting all parts of the sleeve bearing 45. The oil flows from the upper end of the sleeve bearing 45 and flows downward through the passages 42b and into the cavity 40 around the sleeve 41. The cool oil flowing continuously and being brought into contact with the sleeve bearing 45 keeps it cool. The cool oil also takes heat from the rotor 49 of the motor as previously described and tends to keep it cool also.

A very important part of the invention, as pointed out in the objects, is that the pump-head is so designed that it is possible to have an accurate T relation between the thrust bearing 31 and the sleeve bearing 45. It will be seen that the thrust bearing 31 and the sleeve bearing 45 have only two parts interposing them, namely, the upper part of the body 15 and the shell 33. As previously pointed out the walls 29 and 30 and the face 35 of the flange 34 may be accurately machined and the face 37 of the flange 36 and the counterbore 43 may also be accurately machined. When these parts are assembled together absolute T relation between the bearings will be obtained. This is highly important in view of the fact that any deviation from an accurate T relation will result in an uneven distribution of wear on the bearings, causing them to be damaged very soon.

Another important feature of the invention is the forming of the oil bowl 24 so that the body of oil 66 is cooled by the water passing through the pump-head.

A still further feature of this invention is the oil pumping arrangement which delivers cool oil continuously to the sleeve bearing 45 and continuously cools the rotor 49.

The design of the pump is such that a liberal supply of oil for the bearings may be retained at all times which is conducive to long and continued service of the pump-head without attention. The sleeve bearing is quite long and is quiet running so that the noise produced by the operation of the pump-head will be small. The design of the pump offers ease of assembly and disassembly, which is a very important thing from the consideration of the servicing of the pump-head.

In the preceding description the radial bearing is a sleeve bearing. This invention also comprehends a ball bearing for a radial bearing.

I claim as my invention:

1. In a pump-head of the class described, the combination of: a body having an oil-bowl jacketed by the liquid passing through said pump-head; a pump-shaft extending through said oil bowl; a shell supported by said body, said shell having a sleeve concentric with said pump-shaft; a bearing carried by said sleeve at a point above said oil bowl; a spindle inside said sleeve and surrounding said pump-shaft, said bearing engaging said spindle, said spindle extending into said oil bowl and having means for establishing an oil pressure in the lower end of said sleeve, and a helical groove formed on the periphery of said spindle for moving oil upward between said sleeve and said spindle for lubricating said bearing; and drive means for operating said shaft.

2. In a pump-head of the class described, the combination of: a body having an oil bowl; a pump-shaft extending through said oil bowl; a shell supported by said body, said shell having a sleeve concentric with said pump-shaft; a bearing carried by said sleeve; a spindle inside said sleeve and surrounding said pump-shaft, said bearing engaging said spindle, said spindle extending into said oil bowl and having openings for throwing oil from the interior of said spindle into an annular pressure chamber formed in the lower end of said sleeve, and means for moving oil upward from said annular pressure chamber for lubricating said bearing; and drive means for operating said shaft.

3. In a pump-head of the class described, the combination of: a body having an oil bowl; a pump-shaft extending through said oil bowl; a shell supported by said body, said shell having a sleeve concentric with said pump-shaft; a bearing carried by said sleeve; a spindle inside said sleeve and surrounding said pump-shaft, said bearing engaging said spindle, said spindle extending into said oil bowl and having means for throwing oil from the interior of said spindle into an annular pressure chamber formed in the lower end of said sleeve, and having a helical groove formed on the periphery of said spindle and communicating with said annular pressure chamber for moving oil upward between said spindle and said sleeve and through said bearing; and drive means for operating said shaft.

4. In a pump-head of the class described, the combination of: a body having an oil bowl; a pump-shaft extending through said oil bowl; a shell supported by said body, said shell having a sleeve concentric with said pump-shaft; a bearing carried by said sleeve above the oil level in said oil bowl; a spindle inside said sleeve and surrounding said pump-shaft, said bearing engaging said spindle said spindle extending into said oil bowl, there being longitudinal channels formed in said bearing to conduct oil through said bearing; and pump means provided upon said spindle for delivering oil under pressure to one end of said channels.

5. In a pump-head of the class described, the combination of: a body having an oil bowl jacketed by the liquid passing through said pump-head; a pump-shaft extending through said oil bowl; a shell supported by said body, said shell having a sleeve concentric with said pump-shaft; a bearing carried by said sleeve above the oil level in said oil bowl; a spindle inside said sleeve and surrounding said pump-shaft, said bearing engaging said spindle, said spindle extending into said oil bowl; a motor for rotating said spindle; and a centrifugal oil pump provided on said spindle for forcing oil through said bearing in cooling relationship with said motor.

6. A pump-head of the class described, including: a body, said body having walls forming a water chamber having an inlet and an outlet; walls forming an oil bowl, said oil bowl extending into said water chamber so as to be jacketed by the water passing therethrough; a rotatable element extending into said oil bowl; a bearing above said oil bowl, in which bearing said rotatable element journals; means for rotating said rotatable element; and pump means operated by rotation of said rotatable element for circulating oil from said bowl through said bearing.

7. A pump-head of the class described, including: a body, said body having walls forming a water chamber having an inlet and an outlet; walls forming an oil bowl, said oil bowl extending into said water chamber so as to be jacketed by the water passing therethrough; a rotatable element extending into said oil bowl; a bearing above said oil bowl, in which bearing said rotatable element journals; a rotor connected to said rotatable element and surrounding said bearing so as to be separated therefrom by a relatively small space; and pump means operated by rotation of said rotatable element for circulating oil from said bowl through said bearing so that both said bearing and said rotor are cooled by said oil.

8. A pump-head of the class described, including: a body, said body having walls forming a water chamber having an inlet and an outlet; walls forming an oil bowl, said oil bowl extending into said water chamber so as to be jacketed by the water passing therethrough; a pump-shaft; a rotor secured to said pump shaft above said oil bowl; walls forming a cavity closely adjacent a surface of said rotor; and means for circulating oil from said oil bowl through said cavity to cool said rotor.

9. In a pump-head, the combination of: a body forming a chamber having an inlet and an outlet; walls forming an oil bowl extending into said chamber in a manner to be jacketed by a cooling liquid therein; a motor supported by said body a distance above said oil bowl; a pump-shaft operatively connected to said motor; a pumping means driven by said shaft and adapted to force a stream of cooling liquid through said chamber; and means for circulating oil from said oil bowl upward into cooling relationship with a portion of said motor in a manner to absorb heat therefrom, said oil then returning to said oil bowl to be cooled.

10. In a pump-head of the class described, the combination of: a body defining a water chamber; an oil bowl extending into said chamber in a manner to be jacketed by the water therein; a shell supported by said body; a bearing supported in said shell at a point above said oil bowl; a pump-shaft; a spindle secured to said pump-shaft and journalled in said bearing, said spindle extending into said oil bowl; and a centrifugal oil pumping means provided on said spindle for forcing oil upward through said bearing.

11. In a pump-head of the class described, the combination of: a body defining a water chamber; an oil bowl extending into said chamber in a manner to be jacketed by the water therein; a shell supported by said body and providing a cavity communicating with said oil bowl; a sleeve mounted in said cavity and extending into said oil bowl; a bearing retained in said sleeve at a point above said oil bowl; a pump-shaft; a spindle secured to said pump-shaft and journalled in said bearing, said spindle extending into said oil bowl; and a centrifugal oil pumping means provided on said spindle for raising said oil upward to said bearing through the space between said sleeve and said spindle.

12. In a pump-head, the combination of: an oil bowl adapted to retain a body of oil; a shell extending upward from said oil bowl and providing a cavity in open communication with said oil bowl; webs extending into said cavity; a sleeve supported by said webs and extending below the surface of said body of oil; a bearing mounted in said sleeve above said oil bowl; a rotatable element journalled in said bearing and extending below the surface of said body of oil; and pumping means associated with said rotatable element and said sleeve for forcing oil upward therebetween, said oil returning to said oil bowl through the space between the walls of said cavity and said sleeve.

13. In combination: an oil bowl adapted to contain a body of oil; a shell having a cavity communicating with said oil bowl; a rotor surrounding a portion of said shell; and means for circulating oil from said oil bowl through said cavity in cooling relationship with said rotor.

14. In combination: an oil bowl adapted to contain a body of oil; a shell having a cavity communicating with said oil bowl; a rotor surrounding a portion of said shell; means for circulating oil from said oil bowl through said cavity in cooling relationship with said rotor; and means driven by said rotor for passing a cooling medium around said oil bowl in cooling relationship therewith.

15. In combination: an oil bowl adapted to contain a body of oil; a shell having a cavity communicating with said oil bowl; a rotor rotatably mounted in heat-transferring relationship with said shell; means for circulating oil from said oil bowl through said cavity; and means for cooling said oil by conduction through the walls of said oil bowl.

16. In a pump head, the combination of: walls forming an oil bowl; bearing means above said oil bowl; a rotatable element journalled in said bearing means; a rotor secured to said rotatable element in driving relationship; means driven by said rotatable element for moving a stream of cooling medium adjacent said walls, there being a lubricating medium in said oil bowl which is cooled by said cooling medium; and means for circulating a stream of said lubricating medium through said bearing and into cooling relationship with said rotor, said stream of lubricating medium returning to said oil bowl to be cooled.

17. In a pump head, the combination of: a rotor providing a chamber; a stator around said rotor; a shaft secured to said rotor; stationary walls defining liquid-circulating passages, said walls extending into said chamber in heat-transferring relationship with said rotor; and means driven by said shaft for circulating a stream of cooling liquid through said liquid-circulating passages.

18. In a pump head, the combination of: walls defining an oil bowl containing a body of liquid; a shaft; a rotor secured to said shaft and providing a chamber; walls defining passages communicating with said liquid in said oil bowl, said walls extending into said chamber in heat-transferring relationship with said rotor; means for circulating said liquid from said oil bowl through said passages, said liquid returning to said oil bowl; and means driven by said shaft for cooling the liquid in said oil bowl.

19. In a pump head, the combination of: a body providing a water chamber having an inlet and an outlet; means including a shaft and a pumping means for forcing a cool liquid through said chamber; an oil bowl extending into said water chamber in the path of travel of said liquid when passing therethrough; an oil tube surrounding said shaft and extending from a point inside said oil bowl to said pumping means; tension means in said oil bowl and acting to place a tension on said oil tube; and an oil level tube secured to said tension means and extending upward around said shaft to a point above the surface of said liquid in said oil bowl.

In testimony whereof, I have hereunto set my hand at Los Angeles, California, this 3 day of Feb., 1927.

CARL E. JOHNSON.